United States Patent

[11] 3,591,290

| [72] | Inventors | Norman R. Zinner<br>Seattle, Wash.;<br>Rogers C. Ritter, Charlottesville, Va.;<br>Donald W. Baker, Bothell, Wash. |
|---|---|---|
| [21] | Appl. No. | 813,591 |
| [22] | Filed | Apr. 4, 1969 |
| [45] | Patented | July 6, 1971 |
| [73] | Assignee | The Battelle Development Corporation<br>Columbus, Ohio |

[54] UROLOGICAL APPARATUS AND METHOD
28 Claims, 12 Drawing Figs.

[52] U.S. Cl. .................................................... 356/102, 128/2
[51] Int. Cl. ..................................................... G01n 15/02, A61b 5/10
[50] Field of Search ........................................ 356/102, 103; 250/218; 128/2.05, 2

[56] References Cited
UNITED STATES PATENTS

| 2,891,722 | 6/1959 | Nuttall et al. | 356/102 X |
|---|---|---|---|
| 3,163,176 | 12/1964 | Darling | 250/218 X |
| 3,349,227 | 10/1967 | Martens et al. | 356/102 X |

Primary Examiner—Ronald L. Wibert
Assistant Examiner—Conrad Clark
Attorney—Christensen, Sanborn & Matthews ABSTRACT: A method and apparatus to analyze urological difficulties by utilizing interaction of variations in the urine stream and a light beam or other field effect to derive electrical signals, e.g. impulses representative of individual drops comprising the stream, analysis of which individually and in groups or patterns provides diagnostic information.

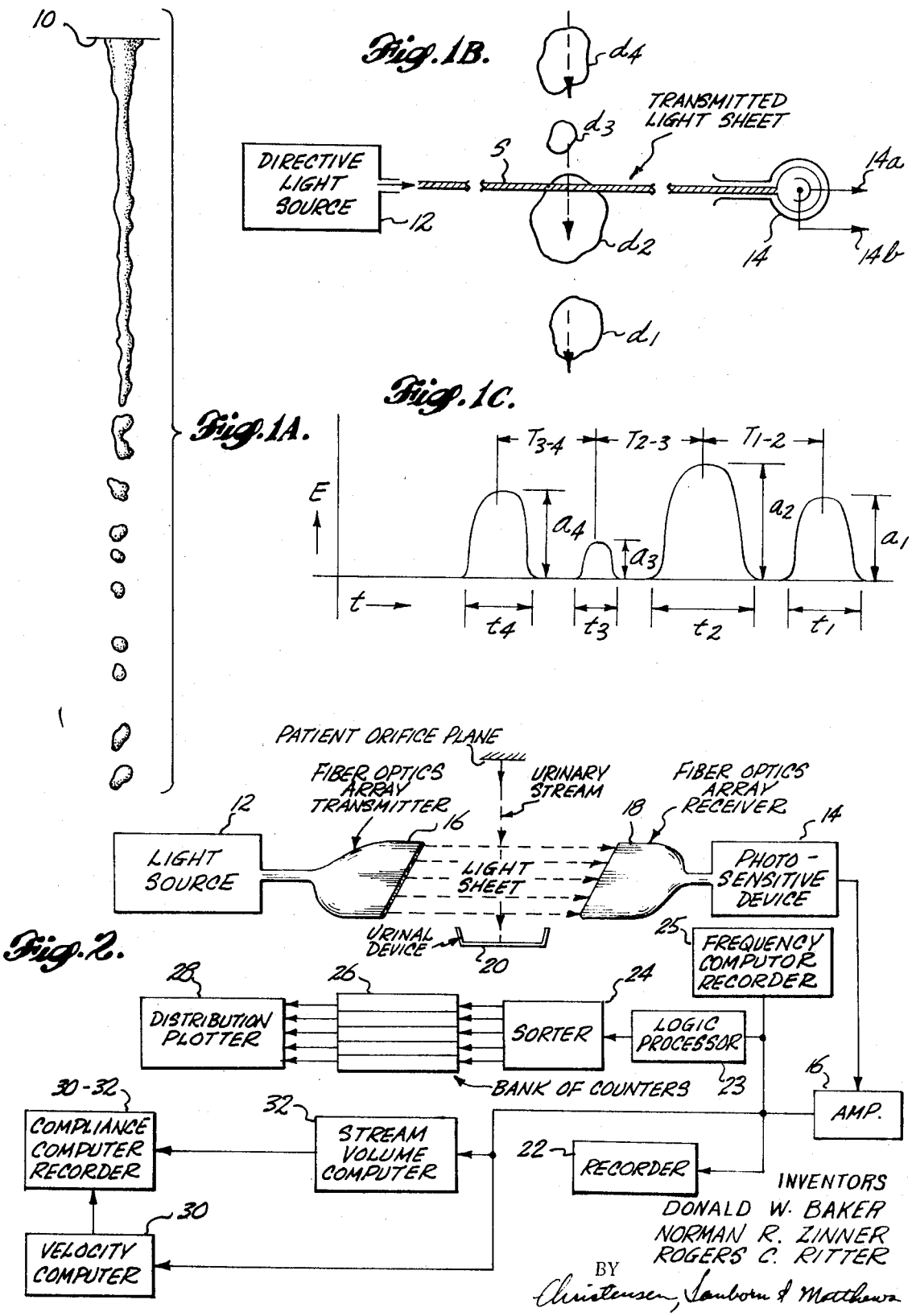

INVENTORS
DONALD W. BAKER
NORMAN R. ZINNER
ROGERS C. RITTER
BY Christensen, Sanborn & Matthews
ATTORNEYS

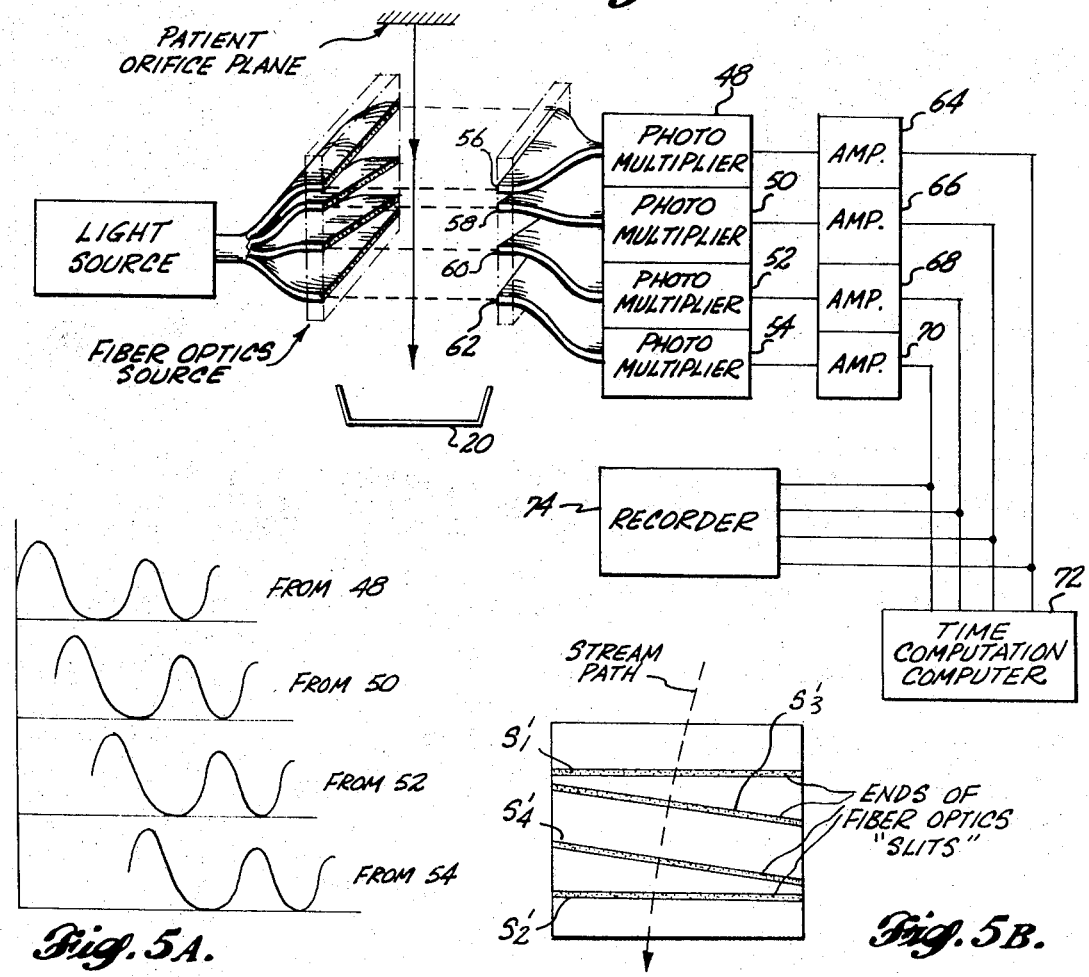

UROLOGICAL APPARATUS AND METHOD

DESCRIPTION

This invention relates to new and improved apparatus and techniques for diagnosis of abnormalities in the urinary tract of a patient such as may be caused by malignancies, infections or other disturbances, and which affect compliance or produce obstructions or stenosis, and for determining the approximate relative location thereof in the tract (i.e., proximal or distal) by noncontacting, noninterfering means of detection and analysis. The invention is herein illustratively described by reference to the presently preferred embodiments thereof; however, it will be recognized that certain modifications and changes herein with respect to details may be made without departing from the essential features involved.

The invention described herein was made in the course of work under a grant or award from the Department of Health, Education and Welfare.

As background herein, it was realized that existing apparatus and methods for detecting an obstruction or a stenosis, for example, are relatively crude, inexact and primarily reliable only in an advanced state of the condition. Moreover such techniques were unpleasant to endure, usually had traumatic effect, masking or altering the true condition, and in themselves could aggravate the condition. It was therefore determined that a high desirable objective in the art was to provide a reliable and consistently accurate method and apparatus which would not physically contact the patient, which would in all other respects be psychologically and physiologically acceptable, nontraumatic and nondisruptive, and furthermore which would provide valuable diagnostic data revealing not only advanced stenoses, but also the incipient stages thereof, much more so than with prior instrumentalities. A broad object of this invention is to provide such an apparatus and technique. A more specific object is to devise such a method and means as may be employed under dynamic conditions, that is during normal voiding without bodily contact, disturbance, traumatic effect or interruption of the natural process and as a result thereof provide information in a much more sophisticated and meaningful form than with prior techniques. Moreover it is a specific purpose hereof to provide data based upon operating parameters which are found to yield consistently reliable diagnoses, that is tests which for most if not all patients are subject to the same interpretative criteria and are repeatable with a patient at intervals over an extended period of his life so as to accurately monitor his state of health urologically. Furthermore it is an object to provide such a method and apparatus which may be used conveniently under clinical conditions, in comfort and privacy so as to avoid psychological effects which could interfere with normal functioning and correspondingly meaningful readings, and related considerations.

A further object hereof is to devise such a system avoiding the problems usually encountered with the handling and processing of urological diagnostic and surgical instruments, namely subject preparation and cooperation, or instrument sterilization and manipulation. With the present invention a single apparatus requiring minimal care and attention may be used to run literally dozens of tests on as many different patients in a single day. Moreover such apparatus lends itself to substantially or fully automatic control, recording of data, computerized readout and interpretation.

In brief terms the invention is characterized by settingup a field pattern across the urinary stream path which field is affected by the presence of or variations in detectable manner enabling production of electrical signals representative of characteristics of the urinary stream. These characteristics in turn are diagnostically related to conditions in the urinary outflow tract. Thus it becomes possible to derive a succession of electrical signals representative of respective individual drops by interaction of such drops with a spatial pattern of field energy, and to measure and/or record one or more characteristics of the stream through use of computers, indicators and recorders as desired. Preferably, in accordance with a further feature, the electrical signals are derived by sensing variations in amount of light received via a sheetlike beam which is intersected by the drops. In some cases two or more parallel spaced sheet light beams are utilized. Photoelectric means responsive to the variations in light energy caused by the drops intersecting the beam, or beams, produce discrete impulses representative of the size and velocity of the individual drops, impulse magnitude comprising a measure of drop size, and impulse magnitude and duration (or time interval intersection of successive light beams by the same drop in case spaced beams are used), providing parameters from which velocity may be computed. Drop signal frequency and drop signal count in different magnitude ranges (i.e., temporal or spatial distribution) provide additional parameters. All of these and related characteristics capable of being measured, computed and recorded are found to have diagnostic meaning for the purposes and in the vein previously indicated herein.

As a further feature such a means for deriving electrical signals are combined with a urinal device and may serve in a permanent installation in a clinic, hospital or doctor's laboratory with suitable sensing, recording and computing circuits located in the vicinity or remotely therefrom and with suitable transmitting facilities in case one or more remote stations are required for accumulating, storing and interpreting the data.

In thus briefly characterizing certain features of the invention it may be stated in apposition that the inventive concepts hinge on recognition of a distinctive and characterizing relationship of urine streamflow patterns and urinary tract stenosis and other conditions, together with the finding that these relationships are general to all patients in identifiable classes (such as males by different age groups) and that for a particular individual tested over a period of months or years they are essentially consistent, yet will undergo detectable changes in response to incipient urological difficulties so as to enable detection thereof at an early stage when the symptoms measured by ordinary techniques are so subtle as to escape detection. Moreover by sensing the change in light transmission obstructed by the drops, the liquid drops essentially block subtended areas of the light beam and yield substantially the same electrical impulses regardless of degree of opaqueness or color of the urine.

These and other features, objects and advantages of the invention will become more fully evident from the following description thereof by reference to the accompanying drawings.

FIG. 1A is an approximate illustration of a typical urinary stream showing its breakup into drops at a distance from the patient-orifice plane, i.e. the meatus.

FIG. 1B is a diagrammatic illustration of successive drops moving transversely across a point of intersection with a sheet of transmitted and received light.

FIG. 1C is a time-voltage diagram of successive electrical impulses derived by a photocell responsive to variations in transmitted light caused by the successive drops partially obstructing its path as in FIG. 1A.

FIG. 2 is a simplified block diagram showing one system in which various diagnostic data are derived from the interaction effect depicted in FIGS. 1B and 1C.

FIG. 5 is a simplified block diagram of still another variation, wherein two pairs of parallel light sheets are employed, the sheets of one pair being angled to those of the other pair, so as to provide a basis for mathematically correcting for nonperpendicular traversal of the urinary stream across any one light sheet.

FIG. 5A shows pulses provided by interruptions of the four beams.

FIG. 5B shows the sheet beams cross-sectionally.

FIG. 6 is a distribution chart indicating relationships between urinary obstruction location and urinary stream measurements by this invention.

Figure 3:
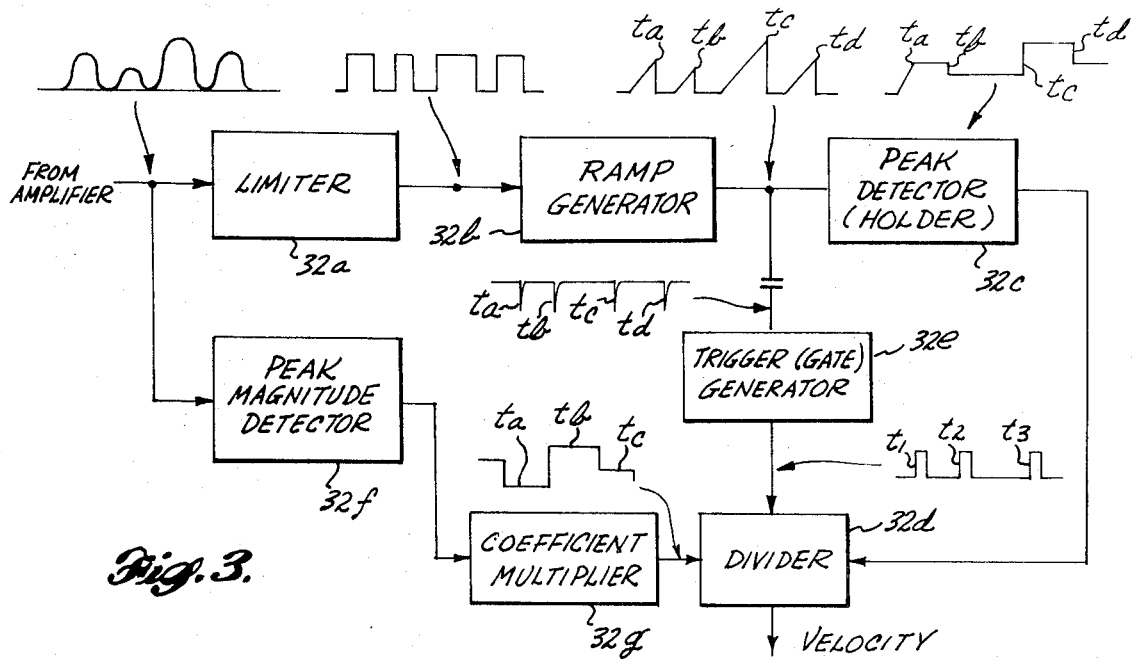
FIG. 3 is a simplified block diagram of a system for computing stream velocity from the characteristics of the derived impulses.

In FIG. 1A the patient-orifice plane 10 represents the location of the meatus or opening of the urinal passage. Discharge of urine through this orifice is of course under some pressure and the resultant stream which emerges possesses initially the cross-sectional form of the orifice, but in following laws of hydraulics, oscillates in a standing wave pattern before it eventually breaks up into drops. The resultant drops themselves have centroids which move in spaced relationship with a mean velocity which is the stream velocity at the particular point of observation. At any given position along the train of drops comprising the stream the intervals, velocities and sizes of the drops have distributions about mean values which are characteristic of the stream. The drops continue to express their retained standing wave energy by changing shape in resonant cycles as they move downstream. This resonant interchange of energy within each drop by interplay of surface tension and mass, analogous to the spring and mass experiment in physics studies, is resisted by viscosity of the liquid and attenuated by energy losses attending motion of the liquid within the drops. For purposes of this invention one may show that there is a characteristic and detectable relationship between the presence (including the degree) and the location of a stenosis or other obstructive, distensive or other abnormal or normal condition and one or more characteristics of the moving drops of the urinary stream. Thus, for example, a distal stenosis can be readily distinguished from a proximal stenosis and both from normal. These and other conditions are indicated by one or more stream drop parameters or combinations thereof including stream velocity, drop size and spacing, and dynamic, temporal, spatial and volumetric patterns. However, averaging occurs, so that despite the irregular and changing drop shapes, in a normal voiding (about 3,000—5,000 drops) measured characteristics of the detected signals and of patterns thereof representing individual drops and drop patterns average out comparably to the theoretical condition of spherical drops so as to simplify the assumptions made about geometrics in computing the relationship between signal magnitude and duration and true drop size.

The breakup of the stream into drops normally occurs within about 10 to 15 centimeters downstream from the patient-orifice plane which distance therefore represents the desired minimum distance of separation between such orifice plane and the energy field. To detect the drops a sheet of light is projected across the stream path and received photoelectrically so as to derive drop-related electrical impulses as depicted in FIGS. 1B and 1C. In FIG. 1B a directional light source 12 produces a thin and relatively wide light sheet S, normally horizontally disposed, and directed against a photoelectric receiver such as a photomultiplier tube 14 or series of such tubes whose output signals from terminals 14A and 14B add together to provide a total electrical response changing with the amount of light being received at any instant. In the one-beam version of the system thus depicted the stream drops $d_1$, $d_2$,... are assumed to follow a path which intersects the light sheet S approximately perpendicularly. With each drop traversing the light sheet a certain amount of light is obstructed from reaching the photocell 14 and there is a corresponding variation in the electrical output from the photocell appearing at terminals 14A and 14B (assuming a photo generative type of cell—although photoresistive or other devices may also be used). Thus with drops whose centroids have equal velocities a large drop $d_2$ produces a greater variation or impulse than a small drop such as drop $d_3$; moreover, the larger the drop the longer the duration of the resultant impulse which it produces in the photocell.

FIG. 1C depicts impulses produced by variations in the light beam occurring by traversal of the drops across such a beam. It will be seen that there is a relationship between impulse amplitude and duration and the size of the drops which the impulses represent. Thus drop $d_1$ produces an impulse amplitude $a_1$ and an effective impulse duration $t_1$, drop $d_2$ an amplitude $a_2$ and duration $t_2$, etc. The time intervals $T_{1-2}$, $T_{2-3}$, $T_{3-4}$, etc. between impulses of course represent the temporal spacings or time intervals between drops in the stream. Ideally these intervals are measured between drop centroids but in practice time referencing may be made to leading or trailing edges or to some other pulse characteristic. In case spatial intervals are to be used they can be derived from knowledge of temporal intervals and velocity.

As will be evident the directive light source may produce light in any part of the visible spectrum or at invisible wavelengths. If desired other forms of energy or types of space fields may be used if the traversing drops will produce a definable and detectable interaction therewith that can be sensed electrically by an appropriate pickup device. To be useful for this purpose the type of field used should be adapted to detect the drops and provide related electrical signals which represent the one or more characteristics of the series of drops which carry information of the nature described herein. For these purposes a thin beam of electromagnetic field energy (i.e., light) has certain unique advantages in terms of the simplicity of apparatus by which it may be produced and detected and the high degree definition or resolution attainable by a thin light beam capable of detecting the drops singly and of providing a signal whose duration, amplitude and to some degree its shape are all significant parameters representative of the individual drop.

In FIG. 1B the transmitted beam and receiving "beam" are both directional. The light source used preferably should be energized by direct current so that the light will not fluctuate due to alternating energization effects and the light source preferably should be a regulated source. The receiving or sensing system, as an optical-electric transducer and associated amplifier circuit (shown elsewhere) preferably also should be regulated so that a constant reference value of output from the receiving side of the system will be provided at all times in the absence of passing droplets. Preferably, however, the light source should be a constant output source so that the absolute contribution in the output circuit of the receiver which is due to the amount of light received will bear the same relationship at all times to the absolute contribution due to the quiescent level state in the receiving circuit related to supply voltage, amplifier gain, etc. With these precautions particles of a given effective size or masking effect traversing the light beam will produce the same magnitude and duration of signal in the output part of the receiving system under all conditions.

In FIG. 2 there is illustrated a simple systematic arrangement in which the light source comprises a suitable means to produce light energy in the visible spectrum which energy is delivered to a bundle of optical fibers 16 of polystyrene, glass or similar material capable of propagating light without side loss for emission in parallel wave fronts out the ends of the fibers. Such fibers arranged in a flat sheetlike array direct a sheet of light across a region of space and are received by a similar set of arrayed directional optical fibers 18 which converge into and form a source of energization of a photosensitive device 14 such as a photomultiplier. The intervening space between the transmitting and receiving photo-optic arrays 16 and 18 comprises the region through which the patient voids from a location (i.e., the patient-orifice plane) suitably spaced from the location of the light pattern for purposes later described and so as to direct the urinary stream transversely through the sheet of light produced. Such an arrangement is conveniently incorporated in a urinal device having a suitable receptacle shown schematically and designated 20 which of course is representative of any suitable means such a modified or adapted urinal or toilet unit in association with which the appropriate photoelectric elements are incorporated. Preferably these are made unnoticeable to the patient so that the individual is not likely to be psychologically influenced by the knowledge or awareness that there is any particular diagnostic significance or potential consequence to arise out of the act of voiding, it being desired to avoid raising fears and apprehensions in the mind of the patient which could influence the urethral properties in an unnatural manner and modify the resultant data.

In the output of the photosensitive device 14 is an amplifier 16 which produces the signals such as those shown in FIG. 1C. In a typical application the amplifier may have a gain of 1,000 and may provide, therefore, discrete strong electrical voltage or current impulses usable in any of the one or more detecting, recording, measuring, counting, storing or computing circuits utilized to analyze or extract the diagnostic information inherently provided by the electrical impulses thus derived.

In the showing of FIG. 2, a recorder 22 is often valuable as one instrumentality of the system. In addition to affording a check on the other instrumentalities, it faithfully reveals the shape, spacing and magnitude of the impulses for subsequent inspection and analysis, and because of its ability to record pulse shape is capable of revealing characteristics perhaps more subtle than might be derived in such operations as pulse counting, amplitude detection, duration detection, etc. In another branch of the receiving system a logic processor 23 of any suitable electric circuitry converts the time and amplitude information into a form suitable for sorting. Examples of the information from the logic processor to be sorted are signals which represent the drop intervals, sizes and velocities. The output of the logic processor feeds the sorter 24 which appropriately sorts the signals. For example, the drops may be sorted by size, by temporal and/or space intervals, or other characteristics. This sorter may comprise any suitable or well-known electric circuit having a plurality of discriminating channels each with different threshold values, such that one channel will pass signals of a particular property and the other channels signals of successively different ranges of that property, etc. Pulses passing the respective channels are tallied in their associated electrical counters 26. As an example, these tallies may be used to operate a printing device 28 or otherwise employed to produce a temporal distribution chart wherein drop interval is represented on the abscissa scale and tallied numbers of drops of the different intervals are plotted on the ordinate. Such a chart of temporal distribution will change for a given patient if his urethral tract undergoes a significant change. This change will be reflected, for example, in the distribution of drop intervals. Thus the major area under the curve shifts toward the range of smaller drop intervals as a distal stenosis develops and toward the range of larger drop intervals as a proximal stenosis develops.

In the same drawing figure, there is also shown a stream velocity computer 30 which operates on the basis of the magnitude and duration parameters of the individual drops. Thus inasmuch as a large drop will require a longer time to cross the light beam than a small drop, assuming both are moving substantially at the same velocity, it is seen that the pulse duration is not only a function of velocity but of drop diameter. Since, in case of drops equal to or larger in diameter than the light sheet thickness, pulse magnitude is directly proportional to the drop diameter (the dependency is substantially squared in case of a light sheet which is thick in relation to drop diameter), the velocity will be computed as a value proportional to the ratio of pulse magnitude to pulse duration. Simple computer techniques to provide such a computation are readily known and available in the art. As a refinement correction may be made in the velocity computations so as to allow for the fact that the force of gravity increases the velocity of the stream with distance downstream from the patient-orifice plane. The details of such compensative measures and the means of incorporating the same in the velocity computer need not be discussed inasmuch as they will or may follow straightforward mathematical considerations and well-known computer technology.

In addition, the system shown in FIG. 2 has a stream volume computer 32 which may operate in either of different ways. In the example it is assumed to operate directly from the pulses derived from the output of the amplifier 16 and in that event may be regarded as a computer which integrates or tallies a succession of values representing individual pulse magnitudes cubed. That is to say the computer essentially tallies or accumulates the sum of the volumes of the drops and in so doing produces a total equal to the amount of liquid voided. Alternatively the computer for stream volume may operate from the counters in bank 26 and in that case constitutes a summing device for the tallies in the outputs of the respective counters. These and other variations will be evident to those well familiar with computer technology.

In FIG. 3 the velocity computer passes the impulses to a limiter circuit 32a which removes magnitude as a variable, thence to a ramp generator 32b feeding a peak detector 32c so as to produce a voltage output from the latter which varies purely with impulse duration. This is fed to one side of a divider 32d triggered by a gate generator 32e to be operative for brief intervals at the respective pulse and points $t_a$, $t_b$, etc. The opposite side of the divider is energized by a circuit 32f which converts the pulse amplitudes to square waves which are then fed through a coefficient multiplier 32g. The magnitudes of these square waves reflect successive input pulse magnitudes. These magnitudes are maintained until and during the brief gating periods of circuit 32e so that the true quotient of pulse magnitude and pulse duration is taken by divider 32d. The divider output then indicates stream velocity.

Figure 4:
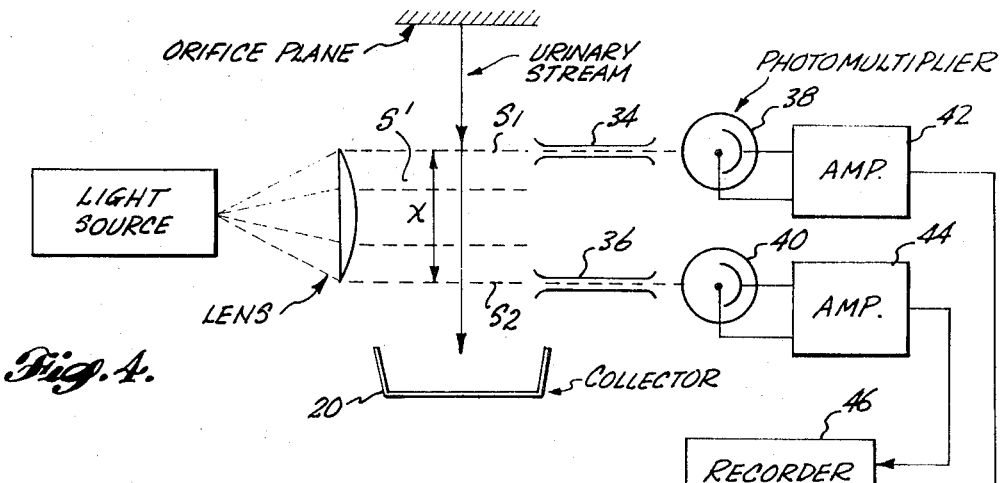
FIG. 4 is a block diagram of a modified system, in this case employing a column of transmitted light received with directional sensitivity as if in two thin sheets.
Figure 4B:
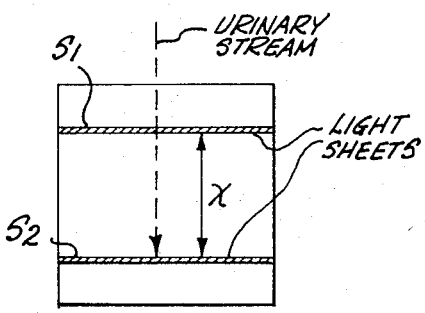
FIG. 4B shows the effective received sheet beams of light in FIG. 4 cross-sectionally.

In the embodiment shown in FIG. 4, a light beam S' is produced. Thin sheetlike portions $S_1$ and $S_2$ of this beam are picked up directionally by associated columnating receivers 34 and 36, and these individually play upon photomultipliers 38 and 40, respectively, the latter with individual amplifiers 42 and 44 and appropriate output circuits and computer means designated "recorder, etc.," 46. With spaced beams $S_1$ and $S_2$ in parallel relationship a urinary stream shown by the dotted arrow will travel a distance X in the process of traversing the distance between the beams. From the time interval elapsing between the instant a particular drop crosses the beam $S_1$ to the time it crosses the beam $S_2$ velocity may be readily computed and in fact is in inverse proportion to such time interval independent of drop size. This arrangement using multiple beams then is another means of computing velocity while providing from either beam a source of the other information as previously ascribed to the effects from a single beam.

Figure 4A:
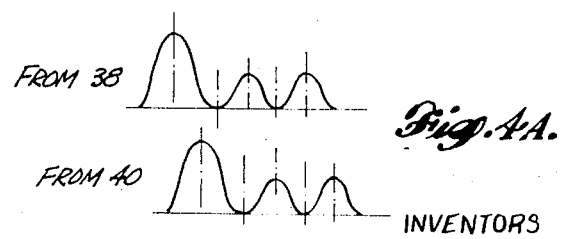
FIG. 4A is a time-voltage diagram of electrical signals produced by respective photocells associated with the two beams of received light.

FIG. 4A shows the impulses produced by the respective amplifiers on a common time base.

In FIG. 5 two sets of parallel light sheets are established across the urinal stream path using optical fiber techniques similar to those employed in FIG. 2. One set of fiber arrays produces parallel substantially horizontal light sheets $S_1'$ and $S_2'$ which correspond to sheets $S_1$ and $S_2$ of FIG. 4, and the second set of fiber arrays produces the mutually parallel sheets $S_3'$ and $S_4'$ which are inclined at an acute angle to the sheets $S_1'$ and $S_2'$ (see FIG. 5B). As a result, a urinary stream may traverse the successive light sheets at any slope or incline (i.e., not necessarily perpendicularly to any one sheet), such as shown by the dotted arrow, yet by measuring the time intervals lapsing between successive crossings of these sheets it is readily possible to normalize the indications so as to correct for the fact that no one single light sheet is traversed by the drops perpendicularly. Thus the configuration permits accurate computation for velocity across the light slits or sheets regardless of stream angle. The mathematics for this computation may be readily derived as $$V = \frac{d_2}{t_2\left(\sin\beta\sqrt{1-\frac{d_1^2}{V^2(t_1+t_2+t_3)^2}} - \frac{d_1\cos\beta}{V(t_1+t_2+t_3)}\right)}$$

wherein $V$ = velocity, $\beta$ = the acute angle of inclination of one set of slits relative to the other, $d_1$ = the distance between the light sheets $S_1'$ and $S_2'$, $d_2$ = the distance between the light sheets $S_3'$ and $S_4'$, $t_1$ = the traveltime of a drop from light sheet $S_1'$ to light sheet $S_3'$, $t_2$ = the traveltime from light sheets $S_3'$ to light sheet $S_4'$ and $t_3$ = the traveltime from light sheet $S_4'$ to $S_2'$. Moreover, it may be shown that the sine of the acute angle of incidence of the urinary stream on the sheet $S_1'$ will be approximately the quantity $$\frac{d_1}{V(t_1+t_2+t_3)}.$$

A graphic recording of the successive trains of impulses developed from the photomultipliers 48, 50, 52 and 54 in this case associated with respective receiving optical arrays 56, 58, 60 and 62, respectively, and amplified in the amplifiers 64, 66, 68 and 70 is depicted in FIG. 5A. The time intervals, assuming appropriate pulse correction techniques to relate the respective times of crossings of the individual successive light sheets to a particular individual drop, may be determined to provide the values $t_1$, $t_2$ and $t_3$. This may be done visually from the graphic recordings and the computations may be made manually. If desired, however, a computerized arrangement may be employed.

It has already been stated that much useful information for diagnostic purposes regarding a lower urinary tract abnormality is derived from a temporal distribution diagram or computation. Other clinical applications which can be made from the derived data include determination of (1) effective diameter of the distal urethra as a function of time, and (2) compliance (i.e., elasticity) of the distal urethra region. Inasmuch as stenotic or rigid distal urethrae are now held to be responsible in many cases of urinary tract infections, particularly in females, both of these determinations have considerable clinical significance. Compliance can be determined because the distal urethral area can be computed accurately as a function of time, from volume and flow velocity rates using the formula: $A=Q/V$, where $A$ equals urethral exit area (i.e., orifice size), $V$ equals velocity and $Q$ equals flow rate. This calculation may be performed dynamically and plotted by compliance computer-recorder 30—32 in FIG. 2, wherein the output of stream volume computer 32 is differentiated to produce flow rate (i.e., rate of change of accumulating volume equals flow rate), and wherein velocity determined by the velocity computer 30 is applied in order to perform the computation of the formula recited above.

The response of the functional orifice diameter to flow velocity changes is a measure of compliance of such orifice. Interpretatively, a totally compliant structure will allow an increased (changing) flow rate to occur without altering velocity, whereas a rigid one will cause the velocity to shift markedly. The rate of velocity change (i.e., response time) as well as its degree allow very accurate and meaningful determinations to be made. Moreover in cases wherein the external urethral orifice is functionally wider than a slightly more proximal narrowing, the stream properties will reflect the proximal narrowing in a manner comparable to that produced by the external orifice itself.

Another example is in the use of velocity information. For example in a case involving a 5-year-old boy, increased voiding velocity above normal indicated urethral stenosis. In the case of a 35-year-old male patient with chronic prostatitis, voiding treatment increased exit stream velocity by 40 percent.

Another example is use of drop frequency information, involving, as it does, a parameter easily measured. Distal urethral stenosis produced a drop frequency double that of a normal boy of approximately the same age. In FIG. 2 a drop frequency computer-recorder unit 25 is incorporated for this purpose and may comprise a device which converts the individual impulses into standardized impulses (i.e., standardized as to magnitude and duration) for application to a suitable counting rate type of circuit such as a frequency discriminator-type circuit.

Still another check on orifice size may be obtained by the combination of information including drop velocity, frequency and stream volume rate. Whereas volume flow rate in milliliters per second can be equivalent in both the normal patient and the patient with submeatal stenosis, it is still possible to determine the stenotic condition by noting the combination of small drop size with higher velocity. Severe meatal stenosis will result in a slower, thin stream which can be distinguished by this invention and also by visual examination.

Also, in cases of proximal obstruction average drop sizes are reduced owing to the normally compliant meatus, which when subjected to the lower internal pressure, tends to retain its naturally coapted state. However in these cases stream velocities are decreased, drop frequency rates are reduced, and volume rates are also reduced.

The reduction of compliance whether proximal or distal as well as other alterations in physical or functional properties of the urinary outflow system have the described effect and others which can be measured in any one of several different ways described herein, each of which may be compared against the other for cross-checking purposes.

Drop distribution properties of the stream also provide useful information particularly insofar as they reflect and represent the dynamic properties of the urethral walls. For determining these subtle conditions with the present state of development of the invention the recording technique is quite helpful and out of which certain patterns are expected to emerge which will reflect the existence of one or more conditions or interacting conditions in complex cases.

The distribution chart in FIG. 6 shows measured stream relationships with urinary tract obstructions, as one example of use of the invention.

Fourier or correlation analysis techniques can be applied to these data as examples of treating even more subtle properties of the stream for informational purposes.

These and other interpretative usages and diagnoses may be provided utilizing the data inherent in the derived electrical signals representative of the individual stream drops and the characteristics of such signals as the characteristics of those drops.

What we claim is:

1. A uroanalyzer comprising means adapted for association with urinal means, for producing at least one energy field directed in space intersectingly across the path of urination, with the path of urination being directed into said urinal means, said field being of such a nature that its traversal by successive drops comprising the urinary stream produces detectable variations in the field, field-detecting means responsive to such variations and operable therefrom to produce successive electrical signals representing the variations so produced, and means responsively connected to such field-detecting means to utilize the signals therefrom.

2. The system defined in claim 1, wherein the field-producing means comprises a light source and the field-detecting means comprises a photoelectric device.

3. The system defined in claim 2, wherein the light acting on the photoelectric device is shaped as a thin sheet of light disposed in a plane generally perpendicular to the urinary stream where it intersects the sheet of light.

4. The system defined in claim 3, wherein the utilizing means is responsive to magnitude of the signals and operable thereby to indicate drop size.

5. The system defined in claim 3, wherein the utilizing means is responsive to both magnitude and duration of the signals and operable therefrom to indicate stream velocity.

6. The system defined in claim 3, wherein the utilizing means is operable to discriminate between and count the signals respectively in accordance with a signal characteristic representing drop size.

7. The system defined in claim 3, including electrical integration means responsive to the signals to compute accumulating urinary stream volume.

8. The system defined in claim 1, wherein the utilizing means is responsive to both magnitude and duration of the signals and operable thereby to indicate stream velocity.

9. The system defined in claim 1 in combination with means responsive to a characteristic of the signals to produce a signal related to urinary stream velocity.

10. The system defined in claim 1, wherein the utilizing means is operable to discriminate between and count the signals respectively in accordance with a signal characteristic representing drop size.

11. The system defined in claim 1 in combination with means responsive to the signals to produce a signal related to stream drop size.

12. The system defined in claim 1, including electrical integration means responsive to the signals to compute accumulating urinary stream volume.

13. The system defined in claim 1 including means responsive to the signals to produce a signal related to urinary stream drop frequency.

14. The system defined in claim 1 including means responsive to the signals to produce a signal related to spatial interval of the drops.

15. The system defined in claim 1 including means responsive to the signals to record the distribution of urinary stream drop size over a selected time period.

16. The system defined in claim 1 including means responsive to the signals to record the distribution of urinary stream drop velocity over a selected time period.

17. The system defined in claim 1 including means responsive to the signals to record the distribution of urinary stream drop temporal interval over a selected time period.

18. The system defined in claim 1 including means responsive to the signals to indicate the total number of drops over a selected time period.

19. Uroanalytic apparatus comprising means to project propagative wave energy for intersection transversely with a urinary stream produced by a patient, and wave energy detector means arranged to receive such wave energy influenced by incidence thereof upon the urinary stream, said detector means being operable to produce electric signals representative of wave energy variations produced by the stream.

20. The apparatus defined in claim 19, combined with a urinal device, wherein the energy-projecting and detector means utilize a generally horizontal relatively wide and thin sheet of light propagating from one to the other in a plane sufficiently spaced from the patient-orifice plane to allow natural breakup of the stream into drops above such intersection.

21. The apparatus defined in claim 20, wherein the detector means includes means to respond to at least one of the magnitude and duration of stream-induced variations in the amount of light received by the detector means.

22. The apparatus defined in claim 19, adapted for combination with a urinal device, wherein the energy-projecting means comprises two directional light sources producing respective generally horizontal relatively wide and thin sheets of light generally parallel to each other and spaced apart in the direction of the urinary stream, means for gauging position of the patient-discharge orifice plane spaced sufficiently upstream from the nearest of the aforesaid sheets so as to allow natural breakup of the stream into drops above such intersection, said detector means including light receivers aligned with the respective sheets to receive light therefrom and each operable to produce electrical signals representative of wave energy variations produced by successive drops in the stream traversing said respective sheets.

23. The apparatus defined in claim 22, including means operatively associated with each such detector means and operable to record the electrical signals therefrom on a common time scale.

24. In uroanalysis the method of detecting abnormalities within the outflow urinary tract comprising the step of deriving electrical signals representative of individual urine drops during voiding by inducing a field energy interaction with individual drops at a selected location along the urinary stream path, and measuring a characteristic of such signals.

25. In uroanalysis the method of detecting abnormalities within the outflow urinary tract comprising the steps of setting up a pattern of fields across the path of urination which are affected by the urinary stream crossing the same and detecting effects on the field by the urinary stream to produce electrical responses therefrom.

26. A uroanalyzer comprising means adapted for association with urinal means, for producing at least one energy field directed in space intersectingly across the path of urination into said urinal means, said field being of such a nature that its traversal by individual drops composing the urinary stream produces a detectable effect from each of such drops, and detecting means operable to derive an electrical response from such field effect.

27. The uroanalyzer defined in claim 26, including means to compute and indicate a plurality of stream characteristics selected from the following: drop size, stream velocity, accumulating volume, drop frequency, and drop spatial interval.

28. The uroanalyzer defined in claim 26, including means to compute and record a plurality of stream characteristics in a given time period selected from the following: drop size distribution, drop velocity distribution, drop temporal interval distribution, drop spatial interval distribution and total number of drops.